United States Patent [19]
Bogema

[11] Patent Number: 6,021,868
[45] Date of Patent: Feb. 8, 2000

[54] MECHANICAL TRANSMISSION COOLING AND LUBRICATION USING ASSOCIATED ENGINE SYSTEMS

[75] Inventor: Edward J. Bogema, Vicksburg, Mich.

[73] Assignee: Eaton Corporation, Cleveland, Ohio

[21] Appl. No.: 08/922,179

[22] Filed: Sep. 2, 1997

[51] Int. Cl.[7] ................................................ F01M 5/00
[52] U.S. Cl. .................................... 184/104.3; 184/104.2; 184/81; 184/6.22
[58] Field of Search ................................ 184/104.3, 13.1, 184/6.13, 6.12, 6.22, 65, 81, 104.2; 123/196 AB

[56] References Cited

U.S. PATENT DOCUMENTS

| 998,876 | 7/1911 | Daimler | 123/41.31 |
|---|---|---|---|
| 1,992,568 | 2/1935 | Connor | 290/2 |
| 2,681,126 | 6/1954 | Searls . | |
| 3,642,097 | 2/1972 | Koivunen . | |
| 4,356,889 | 11/1982 | Teeter . | |
| 4,842,100 | 6/1989 | Cameron et al. . | |
| 4,903,760 | 2/1990 | Joshi et al. . | |
| 4,962,830 | 10/1990 | Potts | 184/6.12 |
| 5,085,053 | 2/1992 | Hayashi et al. | 60/488 |
| 5,279,391 | 1/1994 | Ward . | |
| 5,467,668 | 11/1995 | Kameda et al. . | |
| 5,483,928 | 1/1996 | Mahlberg et al. | 123/196 AB |
| 5,526,873 | 6/1996 | Marsais et al. . | |
| 5,575,329 | 11/1996 | So et al. . | |
| 5,749,439 | 5/1998 | Van Maanen | 184/6.12 |

FOREIGN PATENT DOCUMENTS

| 905 290 | 11/1945 | France . |
|---|---|---|
| 906 303 | 3/1954 | Germany . |
| 63-195469 | 8/1988 | Japan . |
| 8-049555 | 2/1996 | Japan . |

*Primary Examiner*—Tamara L. Graysay
*Assistant Examiner*—David M. Fenstermacher
*Attorney, Agent, or Firm*—Brooks & Kushman PC

[57] ABSTRACT

A cooling and lubrication system for a mechanical change gear transmission includes a first conduit for providing pressurized lubricating fluid from the engine and a second conduit for returning lubricating fluid to the engine. Lubrication may be provided in a dry-sump operating arrangement through a manifold which distributes lubricating fluid among transmission components. A splash lubrication arrangement controls the level of lubricating fluid by appropriate positioning of the transmission outlet port. A small transfer pump and a one-way valve may be utilized to transfer lubricating fluid from the transmission back to the engine.

10 Claims, 3 Drawing Sheets

MECHANICAL TRANSMISSION COOLING AND LUBRICATION USING ASSOCIATED ENGINE SYSTEMS

CROSS-REFERENCE TO RELATED APPLICATION

The present invention is related to U.S. patent application Ser. No. 08/586,330 titled "Transmission Cooling System" which was filed on Jan. 16, 1996 now U.S. Pat. No. 5,678,461.

TECHNICAL FIELD

The present invention relates to mechanical transmission lubrication and/or cooling systems and methods.

BACKGROUND ART

Mechanical change gear transmissions including synchronized and non-synchronized multiple-speed transmissions for heavy-duty vehicles are well known in the prior art as may be seen by reference to U.S. Pat. Nos. 3,105,395; 4,735,109; 4,754,665; 5,086,897; 5,193,410, and 5,370,013, the disclosures of which are incorporated herein by reference. Such transmissions typically utilize an appropriate fluid to provide lubrication and cooling of rotating gears and shafts. Splash lubrication is provided by maintaining a sufficient level of fluid within the transmission sump so that various components rotate through the fluid and distribute it about the transmission. While splash lubrication provides a relatively simple and effective system for lubricating and cooling the transmission, some loss in efficiency results from the hydrodynamic drag induced by the components which rotate through the viscous lubricating fluid.

For applications which require additional lubrication and/or cooling, a forced lubrication system may be used in conjunction with an oil cooler or other supplemental heat exchanger. A number of such systems are known in the prior art as may be seen by reference to U.S. Pat. Nos. 4,356,889; 5,157,963, and 5,279,391, the disclosures of which are hereby incorporated by reference. These systems typically require an additional transmission-driven pump to circulate the transmission fluid throughout the lubrication and/or cooling circuit (s) which again results in some loss in efficiency.

Integrated powertrains which combine an engine and transmission into a unitized or multi-chamber housing have been developed as may be seen by reference to U.S. Pat. Nos. 3,642,097 and 5,467,668. However, these systems require substantial modifications to both the engine and transmission which must be made at the time of design and manufacture.

SUMMARY OF THE INVENTION

An object of the present invention is to provide a lubrication and/or cooling system for a mechanical change gear transmission suitable for heavy-duty applications which does not require substantial modifications to the engine or the transmission.

Another object of the present invention is to provide a system and method for lubricating and cooling a mechanical change gear transmission which does not require an additional transmission-driven fluid pump.

A further object of the present invention is to provide a system and method for supplemental cooling of a heavy-duty mechanical transmission without requiring a supplemental oil cooler or heat exchanger.

Yet another object of the present invention is to provide a mechanical transmission lubrication and cooling system and method which improves efficiency by reducing drag associated with splash lubrication.

In carrying out the above objects and other objects, features and advantages of present invention, a cooling and lubrication system for a mechanical change gear transmission having a geartrain cooperating with at least one shaft connectable to an internal combustion engine is provided. The engine includes an engine cooling system and an engine lubrication system. The engine lubrication system has a pump for circulating lubricating fluid from an engine sump having a first engine port for providing access to lubricating fluid in the sump and a second engine port for providing access to pressurized lubricating fluid. In one embodiment, the system includes a transmission housing defining a sump portion for collecting a volume of lubricating fluid sufficient to provide splash lubrication to at least a portion of the geartrain when rotating therein. The sump portion includes a first transmission port adapted for fluid coupling to the engine lubrication system. The housing includes a second transmission port adapted for coupling to the engine lubrication system which is preferably positioned higher than the first engine port to facilitate return of lubricating fluid from the transmission sump to the engine sump. A first conduit is provided for supplying pressurized lubricating fluid from the second engine port to the sump portion of the transmission via the first transmission port to provide lubrication for the transmission. A second conduit is provided for returning lubricating fluid from the transmission via the second transmission port to the engine sump via the first engine port to allow cooling of the lubricating fluid by the engine cooling system.

The advantages accruing to the present invention are numerous. For example, the present invention provides lubrication and cooling for a mechanical transmission without an additional oil pump driven by the transmission. As such, transmission efficiency may be improved. Furthermore, the present invention provides an embodiment for dry-sump operation which further increases transmission operating efficiency. Additional cooling capacity is provided without the attendant cost and complexity of a supplemental oil cooler or other auxiliary heat exchanger. Use of the engine lubricant as the transmission cooling and lubricating fluid eliminates the need for a special transmission lubricant.

The above advantages and other advantages, features, and objects will be readily apparent from the following detailed description of the best modes for carrying out the present invention when taken in connection with the accompanying drawings.

BEST MODE(s) FOR CARRYING OUT THE INVENTION

Figure 1:
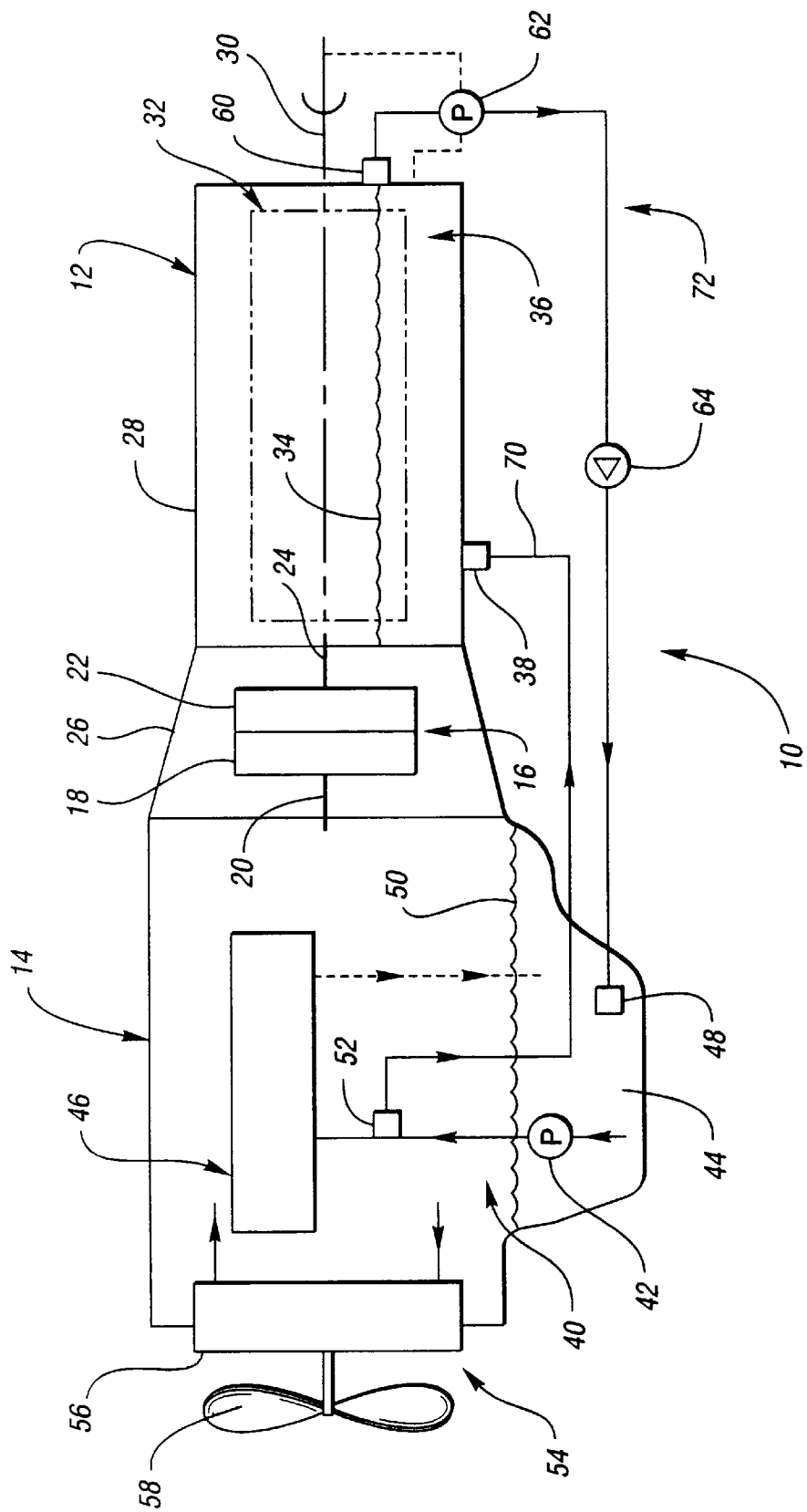
FIG. 1 is a block diagram illustrating a system and method for lubricating and/or cooling a mechanical change gear transmission using associated engine systems according to the present invention.

In the following description of the present invention, certain terminology will be used for descriptive purposes only and is not intended to be limiting. The terms "upward," "downward," "rightward" and "leftward" and derivatives thereof refer to directions relative to the system or device as illustrated in the drawings. "Transmission" is used to designate a simple or compound mechanical vehicular change-gear transmission which may use manual or automatic actuators to select one of a number of gear ratios between an input shaft and output shaft. Examples of such transmissions may be seen by reference to U.S. Pat. Nos. 3,105,395; 4,735,109; 4,754,665; 5,000,060; 5,089,965; 5,193,410; and 5,370,013, the disclosures of which are hereby incorporated by reference in their entirety. The terms "coolant" or "engine coolant" refer to the liquid commonly used in vehicle engine cooling systems, typically a combination of water and an alcohol, such as glycol or the like. The term "transmission fluid" refers to the liquid commonly used in mechanical transmissions to provide lubrication and cooling for the rotating components, such as multipurpose gear oils. The term "lubricating fluid" refers to the natural or synthetic oils commonly used to provide lubrication for vehicular engines.

Referring now to FIG. 1, a block diagram illustrates a system 10 and corresponding method for providing lubrication and cooling for a mechanical change gear transmission 12 using associated systems of an internal combustion engine 14. Engine 14, such as a compression-ignition or diesel engine, is coupled to transmission 12 via a non-positive coupling 16 which may be a master friction clutch or the like. Coupling 16 includes a driving member 18 connected to engine 14 via shaft 20. Driving member 18 is selectively coupleable to a driven member 22 which is connected to a transmission input shaft 24. Non-positive coupling 16 is preferably contained within a housing 26 which connects transmission 12 to engine 14. Housing 26 may be an integral part of a transmission housing 28 or a separate component depending upon the particular application.

Input shaft 24 is selectively coupleable to a transmission output shaft 30 by various components which form a transmission geartrain indicated generally by reference numeral 32. In one embodiment according to the present invention, transmission 12 utilizes a splash lubrication system where one or more components of geartrain 32 rotate through a volume of lubricating fluid, indicated generally by reference numeral 34, contained within a sump portion 36 defined by transmission housing 28. As will be appreciated by one of ordinary skill in the art, geartrain 32 includes various gears, clutches, shafts, bearings, and the like to provide manually or automatically selectable gear ratios between input shaft 24 and output shaft 30. Transmission housing 28 may include various channels, cups, and the like to distribute lubricating fluid among the various rotating components which collectively form geartrain 32.

Sump portion 36 includes a first transmission port 38 adapted for fluid coupling to the engine lubrication system, indicated generally by reference numeral 40. Engine lubrication system 40 may include various components such as a pump 42 for circulating lubricating fluid from an engine sump 44 among various engine components, indicated generally by reference numeral 46. Engine sump 44 includes a first engine port 48 for providing access to lubricating fluid 50 within sump 44. Engine lubricating system 40 also includes a second engine port 52 for providing access to pressurized lubricating fluid circulated throughout engine 14 via engine oil pump 42. Engine 14 includes an associated cooling system, indicated generally by reference numeral 54. A heat exchanger 56, such as a radiator, provides fluid-to-air heat exchange for an engine coolant which circulates throughout a cooling jacket among the various cylinders to provide cooling to the engine components in addition to the engine lubricating fluid or oil, as well known in the art. A fan 58 may also be provided to increase air flow through heat exchanger 56.

With continuing reference to FIG. 1, housing 28 of transmission 12 includes a second transmission port 60 adapted for coupling to engine lubrication system 40. In this embodiment, transmission port 60 is positioned higher than first engine port 48 to facilitate return of lubricating fluid from sump portion 36 of transmission 12 to engine sump 44. Depending upon the particular application, a small transfer pump 62 may be provided to assist in the return of fluid from sump portion 36 to engine sump 44. Pump 62 may be driven by output shaft 30 or a countershaft (not shown) via appropriate coupling. In addition, a one-way valve 64 may be interposed second transmission port 60 and first engine port 48 to inhibit flow of lubricating fluid 50 from engine sump 44 to transmission 12. Proper placement of transmission port 60 may be used to control the volume of lubricating fluid 34 collected within transmission 12. Appropriate control of the volume of fluid may be used to reduce drag associated with the various components of geartrain 32 which rotate through the collected lubricating fluid.

Appropriate selection of transmission ports 38 and 60 allows for an add-on lubrication and cooling system. For example, transmission 12 typically includes a fill port for adding lubricating fluid and a drain port for removing lubricating fluid. In one embodiment, port 38 comprises the transmission drain port, while port 60 comprises the transmission fill port. For the embodiment illustrated in FIG. 1, a first conduit 70 is connected to engine port 52 and transmission port 38 to provide pressurized lubricating fluid from engine port 52 to sump portion 36 of transmission 12. Similarly, a second conduit 72 is provided for returning lubricating fluid from transmission 12 via second transmission port 60 to engine sump 44 via first engine port 48 to allow cooling of the lubricating fluid by engine cooling system 54.

Figure 2:
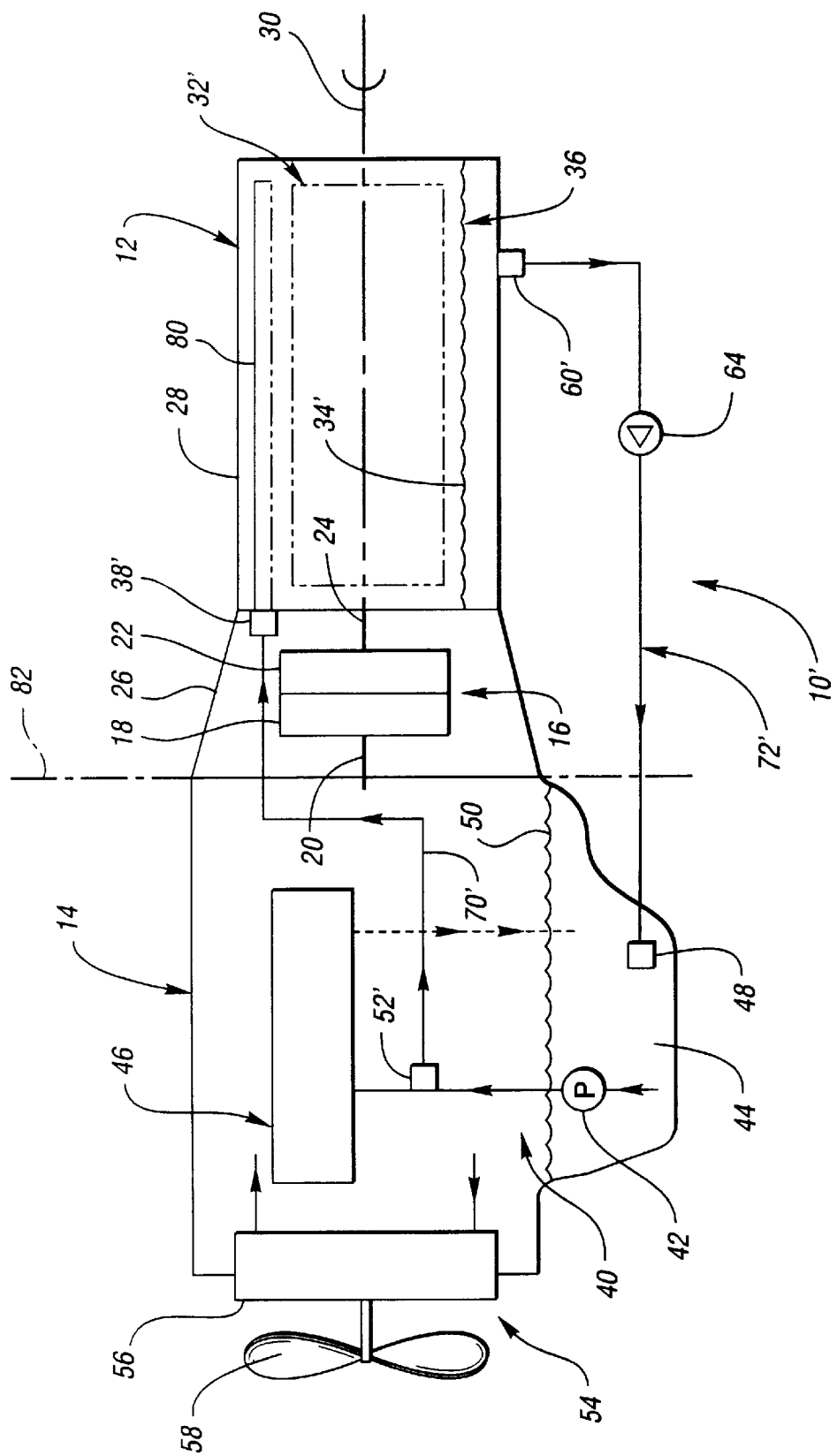
FIG. 2 is a block diagram illustrating another embodiment for lubricating and/or cooling a mechanical change gear transmission using associated engine systems according to the present invention.

Referring now to FIG. 2, additional embodiments of the present invention are described and illustrated. Primed reference numerals generally correspond in structure and function to those elements described and illustrated with reference to FIG. 1. Similarly, like reference numerals correspond to components having similar structure and function as those illustrated and described with reference to FIG. 1. Lubrication and cooling system 10' is preferably utilized with a heavy duty vehicle having an engine compartment which substantially contains internal combustion engine 14. Line 82 generally delineates the engine compartment from the rest of the vehicle. Engine 14 includes an engine cooling system 40 for circulating coolant through an air-to-fluid heat exchanger 56 to cool a lubricating fluid 50 circulating throughout engine 14. Engine lubricating system 40 generally includes a lubrication circuit which provides pressurized lubricating fluid to various engine components which is then returned to engine sump 44. The engine lubrication circuit includes a first port 52' and a second port 48 for providing access to the lubricating fluid 50. An engine lubricating pump 42 disposed within the engine compartment is driven by internal combustion engine 14 to circulate the lubricating fluid 50 throughout various engine and transmission components.

As also illustrated in FIG. 2, a mechanical change gear transmission 12 is disposed outside the engine compartment and drivingly coupled to internal combustion engine 14. Transmission 12 includes a housing 28 defining a sump portion 36 for collecting a volume of lubricating fluid 34'. Housing 28 includes an inlet port 38' coupled to first port 52' of internal combustion engine 14 for receiving pressurized lubricating fluid therefrom. Housing 28 also includes an outlet port 60' coupled to the second port 48 of engine 14 for returning lubricating fluid thereto to be cooled by the engine cooling system 40. In one embodiment, transmission 12 includes a manifold 80 disposed within the transmission and connected to inlet port 38' to distribute pressurized lubricating fluid among a plurality of transmission gears, indicated generally by reference numeral 32'. The lubricating fluid distributed by manifold 80 provides lubrication and cooling of the various transmission components. Unlike the embodiment of FIG. 1, the volume of lubricating fluid 34' is preferably controlled such that the plurality of transmission gears 32' rotates above the lubricating fluid collected in transmission sump 36. This arrangement is sometimes referred to as "dry-sump" operation. The dry-sump arrangement eliminates the oil drag of the various gears and components 32' associated with a splash lubrication system. As such, the arrangement of FIG. 2 is believed to be more efficient.

The manifold 80 (also referred to as a spray bar) provides effective lubrication of all transmission components. Lubricating fluid is supplied via a first conduit 70' which couples inlet port 38' of transmission 12 to first engine port 52'. Likewise, a second conduit 72' couples outlet port 60' of transmission 12 to second engine port 48. Preferably, outlet port 60' of transmission 12 is positioned above second engine port 48 (as installed in the vehicle) to utilize gravitational force in returning lubricating fluid to engine 14.

In an alternative embodiment, inlet port 38' is positioned within sump portion 36' of housing 28. In this embodiment, manifold 80 is not utilized and the transmission is operated using a splash lubrication system. In another embodiment, outlet port 60' is positioned to delineate sump portion 36' of housing 28 to control the volume of lubricating fluid 34' collected therein. This is similar to the arrangement illustrated in FIG. 1. This embodiment may be utilized for both the splash lubrication and dry-sump operating configurations depending on the relative position (height) of outlet port 60'.

Figure 3:
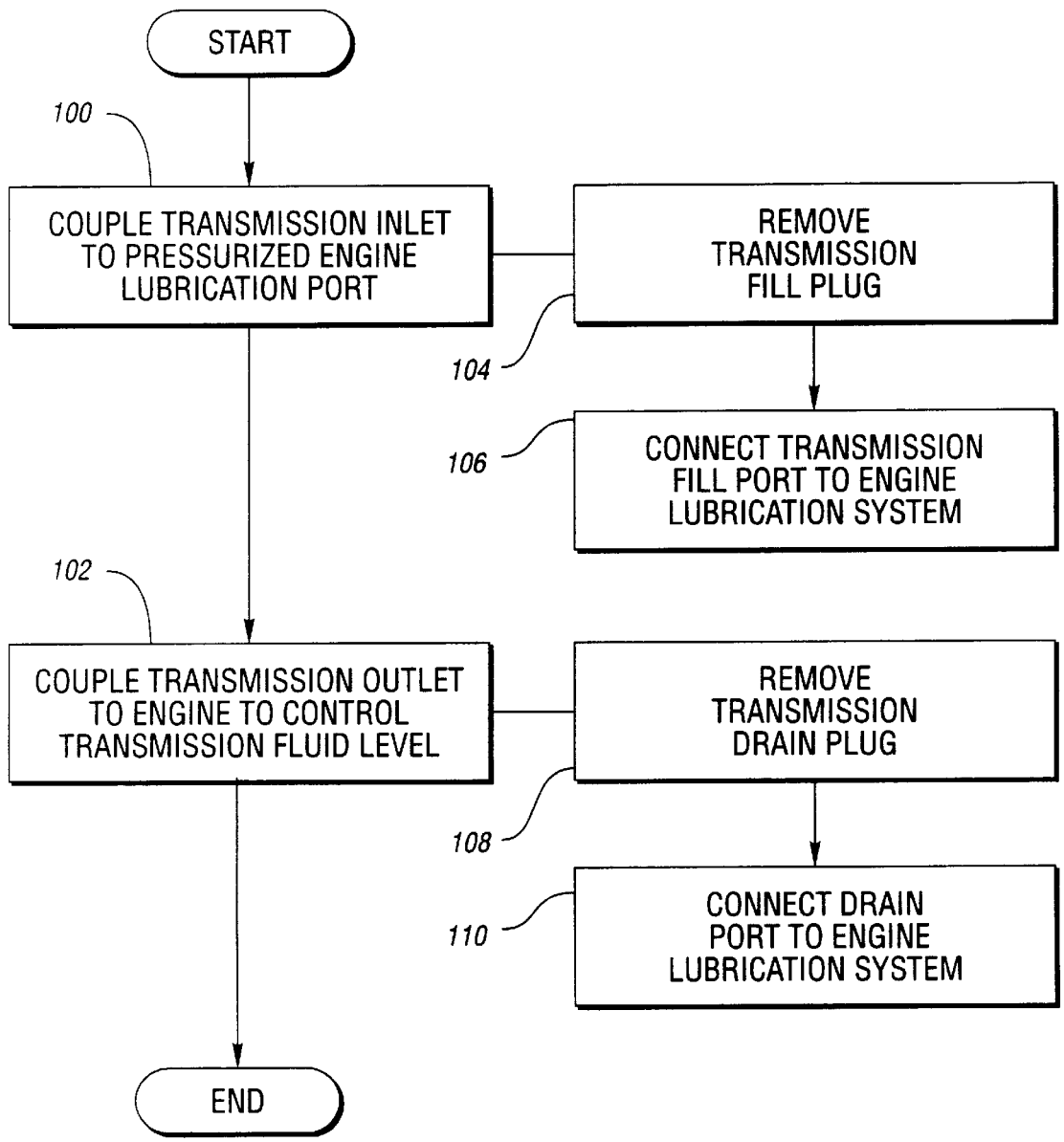
FIG. 3 is a flow chart illustrating a method for lubricating and/or cooling a mechanical change gear transmission using associated engine systems according to the present invention.

Referring now to FIG. 3, a flow chart illustrates a method for lubricating and/or cooling a mechanical change gear transmission using associated engine systems according to the present invention. The method is preferably utilized with a mechanical change gear transmission drivingly coupled to an internal combustion engine having an engine lubrication system and an engine cooling system which cooperates with the engine lubrication system to cool a circulating lubricating fluid.

Step 100 represents coupling an inlet port of the mechanical change gear transmission to a pressurized port of the engine lubrication system. This provides pressurized lubrication in cooling of transmission components using the engine lubricating fluid. Block 102 represents coupling an output port of the transmission to the engine lubrication system to return lubricating fluid to the engine for cooling by the engine cooling system. Preferably, position of the outlet port is selected to control volume of the lubricating fluid collected within the transmission to reduce drag associated with the transmission components rotating through the collected lubricating fluid.

In one embodiment, the mechanical change gear transmission includes a removable drain plug for allowing removal of lubricating fluid through an associated drain port within a sump portion of the transmission. In this embodiment, the step of coupling an inlet port includes removing the drain plug from the associated drain port as represented by block 104 and connecting the drain port to the pressurized port of the engine lubrication system, as represented by block 106.

In yet another embodiment, the mechanical change gear transmission includes a removable fill plug for facilitating additional lubricating fluid to the transmission through an associated fill port. In this embodiment, the step of coupling an outlet port of the transmission includes removing the fill plug from the associated fill port, as represented by block 108, and connecting the fill port to the engine lubrication system, as represented by block 110.

As such, the present invention provides a system and method for supplemental cooling of a heavy duty mechanical transmission without requiring a supplemental oil cooler or heat exchanger. The invention provides for either splash lubrication or dry-sump operation configurations. Use of a common fluid for lubrication and cooling of the engine and transmission eliminates the need for a special transmission lubricant.

While the best modes for carrying out the invention have been described in detail, those familiar with the art to which this invention relates will recognize various alternative designs and embodiments for practicing the invention as defined by the following claims.

What is claimed is:

1. A mechanical change gear transmission having a geartrain with at least one shaft coupleable to an internal combustion engine having an engine cooling system and an engine lubrication system, the engine lubrication system having a pump for circulating lubricating fluid from an engine sump having a first engine port for providing access to lubricating fluid in the sump and a second engine port for providing access to pressurized lubricating fluid, the transmission comprising:

a transmission housing defining a transmission sump for collecting a volume of lubricating fluid sufficient to provide splash lubrication to at least a portion of the geartrain, the housing having first and second transmission ports adapted for fluid coupling to the engine lubrication system, the second transmission port being positioned higher than the first engine port to facilitate gravity-forced return of lubricating fluid from the transmission sump to the engine sump;

a first conduit for providing pressurized lubricating fluid from the second engine port directly to the transmission sump via the first transmission port to provide lubrication for the transmission; and a second conduit for returning lubricating fluid from the transmission via the second transmission port to the engine sump via the first engine port to allow cooling of the lubricating fluid by the engine cooling system.

2. The transmission of claim 1 wherein the second transmission port is positioned to control the level of the lubricating fluid within the transmission sump.

3. The transmission of claim 1 further comprising:

a one-way valve interposed the second transmission port and the first engine port to substantially prevent flow of lubricating fluid from the engine sump to the transmission.

4. The transmission of claim 1 further comprising a fill port for adding lubricating fluid to the transmission wherein the first transmission port comprises a drain port for removing lubricating fluid from the transmission.

5. The transmission of claim 4 wherein the second transmission port comprises the fill port.

6. A powertrain for a heavy-duty vehicle having an engine compartment, the powertrain comprising:

an internal combustion engine disposed substantially within the engine compartment, the engine having an engine cooling system for circulating coolant through an air-to-fluid heat exchanger to cool a lubricating fluid circulating through an engine lubrication circuit, the engine lubrication circuit having first and second ports for providing access to the lubricating fluid;

a pump disposed within the engine compartment and driven by the internal combustion engine for circulating the lubricating fluid; and a mechanical change gear transmission disposed outside the engine compartment and drivingly coupled to the internal combustion engine, the transmission including a housing defining a transmission sump for collecting a volume of lubricating fluid, the housing having an inlet port coupled to the first port of the engine for receiving pressurized lubricating fluid therefrom and an outlet port coupled to the second port of the engine for returning lubricating fluid thereto to be cooled by the engine cooling system.

7. The powertrain of claim 6 wherein the transmission further comprises:

a spray bar disposed within the transmission and connected to the inlet port to distribute pressurized lubricating fluid among a plurality of transmission gears for lubrication and cooling thereof wherein the level of lubricating fluid is controlled such that the plurality of transmission gears rotates above the lubricating fluid collected in the transmission sump.

8. The powertrain of claim 7 further comprising:

a first conduit coupling the inlet port of the transmission to the first engine port; and a second conduit coupling the outlet port of the transmission to the second engine port wherein the outlet port of the transmission is positioned above the second engine port to utilize gravitational force in returning lubricating fluid to the engine.

9. The powertrain of claim 6 wherein the transmission inlet port is positioned within the transmission sump.

10. The powertrain of claim 6 wherein the transmission outlet port is positioned to control the level of lubricating fluid collected within the transmission sump.

* * * * *